July 26, 1938.  H. C. DRAKE  2,124,850
WELDING PROCESS
Filed Sept. 30, 1936

INVENTOR.
Harcourt C. Drake
BY Joseph H. Lipschutz
ATTORNEY

Patented July 26, 1938

2,124,850

UNITED STATES PATENT OFFICE 2,124,850

WELDING PROCESS

Harcourt C. Drake, Hempstead, N. Y., assignor to Sperry Products, Inc., Brooklyn, N. Y., a corporation of New York Application September 30, 1936, Serial No. 103,433

4 Claims. (Cl. 113—112)

This invention relates to a process for welding wherein metal is deposited within the weld area between the two surfaces to be welded. The process comprising my invention is particularly adapted to the welding of rails but has applications to the welding of metals having other cross-sections as will be apparent from the description. In the welding of rail lengths end to end there is the difficulty which arises by reason of the fact that the head of the rail and the base of the rail extend outwardly from the central web. If welding is started at the base of the rail and metal is added within the weld area so as to fill up the space between the bases, and within the space between the webs, it is necessary to stop the welding process when the head is reached in order that plates may be positioned on the under side of the projecting head before the welding process can be continued and metal added in the space between the heads. The stoppage of the welding process for the purpose of positioning said plates beneath the head results in a point of weakness in the weld wherein defects usually develop.

It is the principal object of my invention to vary the welding process heretofore employed in the welding of rails of similar sections, in order to avoid the formation of a point of weakness and thus avoid the formation of a point wherein defects in the weld are likely to originate.

Further objects and advantages of this invention will become apparent in the following detailed description thereof.

In the accompanying drawing.

Figure 4:
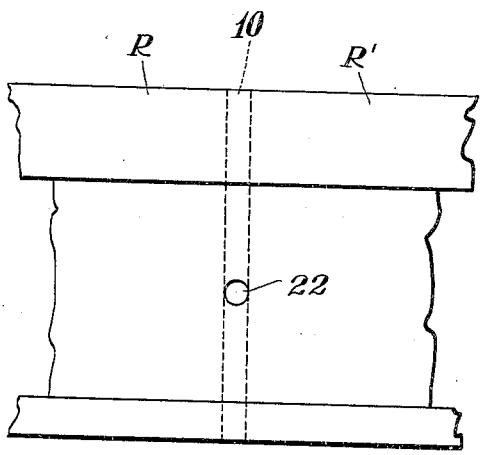
Fig. 4 is a side elevation of the welded sections.

Referring to the drawing, there is shown the end of a rail length R which is spaced from the end of a rail length R' (see Fig. 4) so as to provide a welding space 10 within which metal is to be deposited to join the rail lengths R and R'. The process heretofore employed has been as follows: A state of fusion was created between the metal to be added and the surfaces to be welded. This was done in any of several ways, as, for instance, by creating an arc through connecting one terminal to one of the rails R or R' adjacent the welded area, and connecting the other electrode to the metal to be deposited within the welded space. The said electrodes were connected to a suitable source of alternating current so that an arc was formed which heated the metal to be deposited and the surfaces to be welded to a state of fusion. In another form, the state of fusion may be reached by means of an oxy-acetylene torch which heats the metal to be deposited and the surfaces to be heated. A plate 11 was positioned beneath the bases 12 of the rails to cover the welding space and metal was then deposited in the space 10 beginning in the base portion and extending up through the web to the under side 13 of the railhead 14. At this point it will be understood the welding process had to be interrupted and plates similar to plates 11 positioned beneath the railhead under surfaces 13. Then the welding process was continued to deposit metal in the space 10 adjoining the railheads. The interruption of the welding process caused a point of weakness to be set up where the welded metal joining the heads came in contact with the welded metal joining the webs, and it was found that at this point weaknesses in the weld originated and caused frequent failure of the weld.

Figure 1:
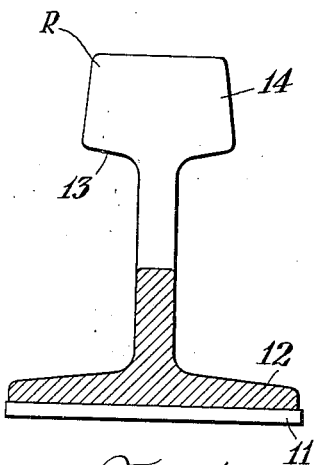
Fig. 1 is an end view showing the first step in my welding process.
Figure 2:
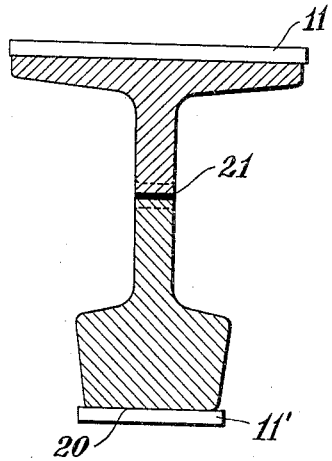
Fig. 2 is a view similar to Fig. 1 showing the second step in my welding process.
Figure 3:
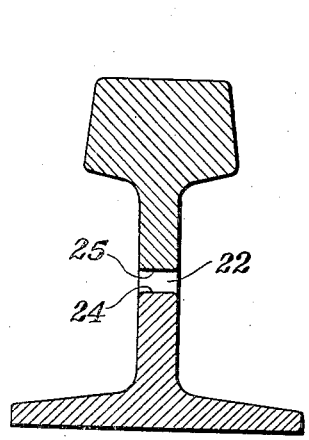
Fig. 3 is a view similar to Figs. 1 and 2 showing the third step in my welding process.

To obviate the defect described above, I provide the following process for welding rails. As before, a plate 11 is positioned beneath the bases 12 across the welding space 10. A state of fusion is created between the metal to be deposited and the surfaces to be welded by any of the means heretofore employed, and metal is deposited in the space 10 joining the bases and extending upwardly into the webs substantially half-way. Here the welding process is stopped and the rail is inverted, as shown in Fig. 2. A plate 11' is then positioned beneath the rail heads across the welding space 10 and the welding process is continued by depositing metal in the space from the tread surfaces 20 at the top of the rail head, upwardly into the space joining the webs until said space is filled to a point which meets the metal deposited from the base upwardly. This meeting edge is indicated at 21. Preferably this edge is the neutral axis of the beam, said axis being defined as the line, in the cross-section of a beam or column in a state of flexure, on which there is neither tension nor compression. The neutral axis passes through the center of gravity of the section when unit stresses do not exceed the elastic limit of the material. The edge 21 is a point of weakness wherein defects in the weld would be likely to originate, but this condition is obviated by drilling a hole 22 through the web for a distance on either side of the meeting edge 21 so as to remove this edge completely. The hole 22 does not weaken the rail strength because it is positioned with its center substantially at the neutral axis, that is, the point of least stress in the rail.

In a modified form of my invention, instead of filling the welding space upwardly from the base into the web and downwardly from the tread into the web until the two welded sections meet at line 21, I may fill upwardly from the base into the web to a point 24 and then fill from the tread to a point 25 which stops short of the edge 24, so that there is no meeting line 21 and thus there is no necessity for drilling a hole 22 since the equivalent of such hole is thus formed.

It will be apparent that by inverting the rail for the second step of the operation as shown in Fig. 2, I avoid the necessity of placing plates beneath the surface 13 and stopping the welding process when the metal has filled the web entirely at a point beneath the railhead such that it is impossible to remove the meeting line of the two sections of welded metal.

In accordance with the provisions of the patent statutes, I have herein described the principle and operation of my invention, together with the apparatus which I now consider to represent the best embodiment thereof, but I desire to have it understood that the apparatus shown is only illustrative and that the invention can be carried out by other equivalent means. Also, while it is designed to use the various features and elements in the combination and relations described, some of these may be altered and other omitted without interfering with the more general results outlined, and the invention extends to such use.

Having described my invention, what I claim and desire to secure by Letters Patent is:

1. A method of welding rails having a neutral axis, which consists in depositing metal from the bases of the rails to be welded part-way up the webs substantially to the neutral axis, inverting the rails, and depositing metal from the treads upwardly substantially to the neutral axis.

2. A method of welding rails having a neutral axis, which consists in depositing metal from the bases of the rails to be welded part-way up the webs substantially to the neutral axis, inverting the rails, and depositing metal from the treads upwardly substantially to the neutral axis and stopping at a point spaced from the metal deposited from the bases upwardly.

3. A method of welding rails having a neutral axis, which consists in depositing metal from the bases of the rails to be welded part-way up the webs to the neutral axis of the rails, inverting the rails, and depositing metal from the treads upwardly to join the metal deposited from the bases upwardly at said neutral axis.

4. A method of welding rails having a neutral axis which consists in depositing metal from the bases of the rails to be welded part-way up the webs to the neutral axis of the rails, inverting the rails, depositing metal from the treads upwardly to join the metal deposited from the bases upwardly at said neutral axis, and removing a portion of the deposited metal which includes the junction of said two deposits.

HARCOURT C. DRAKE.